United States Patent [19]
Yoo

[11] Patent Number: 6,034,844
[45] Date of Patent: Mar. 7, 2000

[54] VIDEO CASSETTE RECORDER EQUIPPED WITH HEAD DRUM ASSEMBLY HAVING A BEARING WITH PUMPING VANES

[75] Inventor: Dae-Sun Yoo, Seoul, Rep. of Korea

[73] Assignee: Daewoo Electronics Co., Ltd., Rep. of Korea

[21] Appl. No.: 08/936,884

[22] Filed: Sep. 25, 1997

[30] Foreign Application Priority Data

Sep. 30, 1996 [KR] Rep. of Korea ............... 96-43314

[51] Int. Cl.[7] ............................................. G11B 5/008
[52] U.S. Cl. ............................................. 360/107
[58] Field of Search ................. 360/107, 84, 130.24; 384/100, 107, 110, 124, 133

[56] References Cited

U.S. PATENT DOCUMENTS

| | | | |
|---|---|---|---|
| 4,706,143 | 11/1987 | Asada et al. | 360/107 |
| 4,961,122 | 10/1990 | Sakai et al. | 360/107 |
| 4,972,283 | 11/1990 | Kim | 360/107 |
| 5,453,892 | 9/1995 | Hasegawa et al. | 360/107 |
| 5,581,425 | 12/1996 | Choi | 360/107 |
| 5,667,308 | 9/1997 | Nose et al. | 384/99 |
| 5,754,374 | 5/1998 | Kim | 360/107 |

Primary Examiner—David D. Davis
Attorney, Agent, or Firm—Anderson Kill & Olick

[57] ABSTRACT

A head drum assembly for use in a video cassette recorder includes a stationary drum, a supporting shaft fixedly fitted into the stationary drum, a rotary drum mounted around an upper portion of the supporting shaft, an upper and a lower bearing for rotatable supporting the rotary drum. The stationary drum is provided with a bearing cavity having a sliding surface formed at a predetermined angle of inclination to a main frame of the video cassette recorder. In particular, the lower bearing mounted to rotate together with the rotary drum is lubricated by an oil lubricant retained in the bearing cavity, and includes pumping vanes for pumping the oil lubricant in such a way that the oil lubricant is uniformly distributed between the sliding surface and one surface of the lower bearing being in contact with the sliding surface.

9 Claims, 3 Drawing Sheets

VIDEO CASSETTE RECORDER EQUIPPED WITH HEAD DRUM ASSEMBLY HAVING A BEARING WITH PUMPING VANES

FIELD OF THE INVENTION

The present invention relates to a video cassette recorder ("VCR"); and, more particularly, to a video cassette recorder eqipped with a head drum assembly having a bearing with pumping vanes to allow a rotary drum therein to rotate smoothly.

BACKGROUND OF THE INVENTION

In general, a VCR is provided with a head drum assembly including a plurality of video heads, a rotary drum, a supporting shaft and a stationary drum. The video heads are fixed to the rotary drum rotatably supported through a pair of the bearings, i.e., a lower bearing and an upper bearing. Each of the bearings is of a sliding bearing type and has an outer peripheral side surface and an inner peripheral side surface. The outer peripheral side surface of each bearing is closely fitted into the rotary drum and the inner peripheral side surface of each bearing is rotatably fitted onto the supporting shaft.

The lower bearing, which is located at a lower part of the rotary drum, is also brought in contact with the supporting shaft and the stationary drum simultaneously. Since the lower bearing supports a radial and a thrust loads of the rotary drum simultaneously, the lower bearing may become overloaded, which, in turn, necessitates a need to lubricate with an oil to be retained in a bearing cavity concavely formed at the stationary drum.

The head drum assembly is used to read/write image signals recorded on a magnetic tape. The image signals are recorded on signal tracks of the magnetic tape. The signal tracks are inclined at a predetermined angle to a traveling direction of the magnetic tape to achieve a high recording density. In order to align the video heads with the signal tracks, the head drum assembly, and, hence the lower bearing, is mounted at the same angle of inclination as that of the signal tracks to a main frame of the VCR, resulting in an uneven distribution of the oil in the bearing cavity, i.e., one side of the bearing cavity having a greater amount of the oil than the opposite side. This may cause the oil to be non-uniformly spread between contact-surfaces of the lower bearing and the bearing cavity, preventing the lower bearing from rotating smoothly and forcing the rotary drum (to which the video heads are attached) to vibrate, which may, in turn, cause a jitter, i.e., screen shaking.

SUMMARY OF THE INVENTION

It is, therefore, a primary object of the invention to provide a head drum assembly, including a rotary and a stationary drums, capable of allowing a lower bearing supporting the rotary drum to rotate smoothly, by allowing an oil film maintained uniformly and in continuum between the lower bearing and the stationary drum.

In accordance with one aspect of the present invention, there is provided a head drum assembly for use in a video cassette recorder comprising: a stationary drum including a bearing cavity for retaining an oil lubricant, the bearing cavity having a sliding surface formed at a predetermined angle of inclination to a main frame of the video cassette recorder; a supporting shaft divided into an upper portion and a lower portion, the lower portion fixedly fitted into the stationary drum; a rotary drum mounted around the upper portion of the supporting shaft; means for rotating the rotary drum;-and bearing means for rotatably supporting the rotary drum and including a bearing fitted onto a lower end part of the rotary drum and mounted for rotating together with the rotary drum, the lower bearing having a thrust support surface being in contact with the sliding surface of the bearing cavity, wherein the lower bearing further has a pumping element for pumping the oil lubricant in such a way that the oil lubricant is uniformly distributed between the thrust support surface and the sliding surface.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
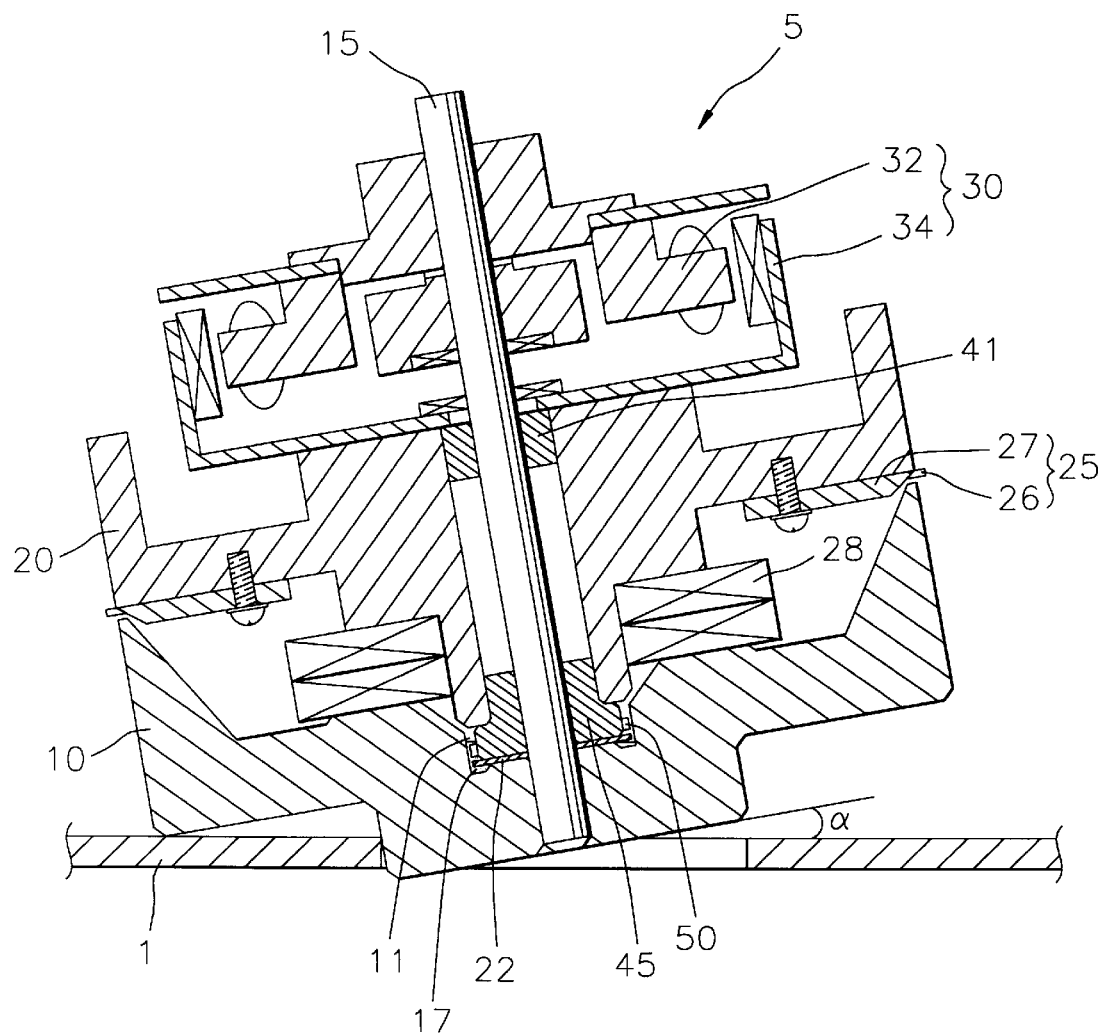
FIG. 1 shows a vertical cross sectional view of relevant parts of a preferred embodiment of the invention.
Figure 2:
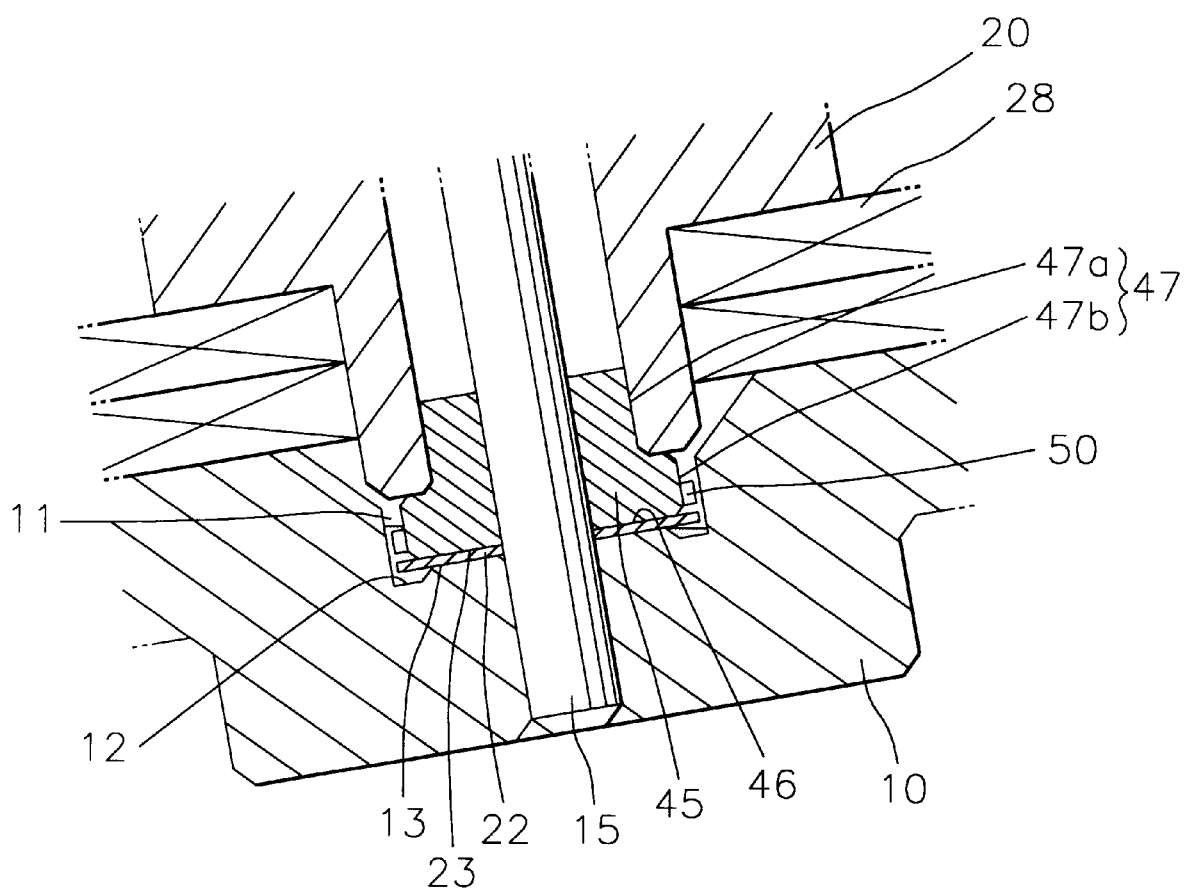
FIG. 2 illustrates a partially expanded cross sectional view of the preferred embodiment of the invention, showing the engagement of a lower bearing and a bearing cavity.

Referring to FIGS. 1 and 2, a head drum assembly 5 in accordance with the present invention is mounted in a main frame 1 of a VCR at a predetermined angle α to the main frame 1, and is provided with a stationary drum 10, a supporting shaft 15, a rotary drum 20, a pair of bearings 41, 45 ,i.e., an upper bearing 41 and a lower bearing 45, for rotatably supporting the rotary drum 20, and an electric motor 30. In addition, the head drum assembly 5 is provided with a plurality of video heads 25 and a transformer 28, each of the video heads 25 including a video head chip 26 and a video head base 27. The video head chip 26 is fixed to the video head base 27 screwed to a bottom surface of the rotary drum 20. The transformer 28 disposed between the rotary drum 20 and the stationary drum 10 is electrically connected to the video head 25.

The stationary drum 10 has a bearing cavity 11 circularly formed at a central part of an upper portion thereof. The bearing cavity 11 is provided with a bottom surface having a trench part 12. The bottom surface is formed at the approximately same angle α of inclination as that of the head drum assembly to the main frame 1 of the VCR. The trench part 12 is concavely formed with a predetermined width along a circumference of the bottom surface and retains an oil lubricant 17.

The supporting shaft 15 is divided into an upper portion and a lower portion. The lower portion vertically penetrates the stationary drum 10 from a center of the bottom surface 13 to a bottom surface thereof, and is fixed to the stationary drum 10.

The rotary drum 20 is mounted around the upper portion of the supporting shaft 15, above the stationary drum 10, and is rotatably supported through the pair of bearings 41, 45 in relation with the stationary drum 10 and the supporting shaft 15.

The electric motor 30 for rotating the rotary drum 20 is provided with a stator 32 and a rotor 34 electrically interacting with the stator 32. The stator 32 is fitted onto an upper end portion of the supporting shaft 15 and the rotor 34 is fixed on a top surface of the rotary drum 20.

The pair of bearings 41, 45 is arranged between the rotary drum 20 and the supporting shaft 15. Each of the bearings 41, 45 is a sliding bearing type, e.g. oilless bearing. The upper bearing 41 is closely fitted into a top part of the inner peripheral side surface of the rotary drum 20 and rotatably fitted onto the supporting shaft 15. The upper bearing 41 supports a radial load of the rotary drum 20 during its rotation.

The lower bearing 45 has a bottom surface, or inner peripheral side surface and an outer peripheral surface 47 divided into an upper portion 47a and a lower portion 47b, the upper portion 47a closely fitted into a bottom part of the inner peripheral side surface of the rotary drum 20. The inner peripheral side surface is rotatably fitted onto the supporting shaft 15 and the bottom surface, i.e., a thrust support surface 46, is in a face-to-face contact with the bottom surface 13 of the bearing cavity 11, i.e. a sliding surface, thus supporting a radial load and a thrust load simultaneously. In the preferred embodiment, disposed between the thrust support surface 46 and the bottom surface 13 of the bearing cavity 11 may be an element 22 for preventing the two surfaces 13, 46 from being worn away when they come into a direct frictional contact. The element 22 is disc-shaped, and in such a case, a top surface 23 of the element 22 may function as a sliding surface.

Figure 3:
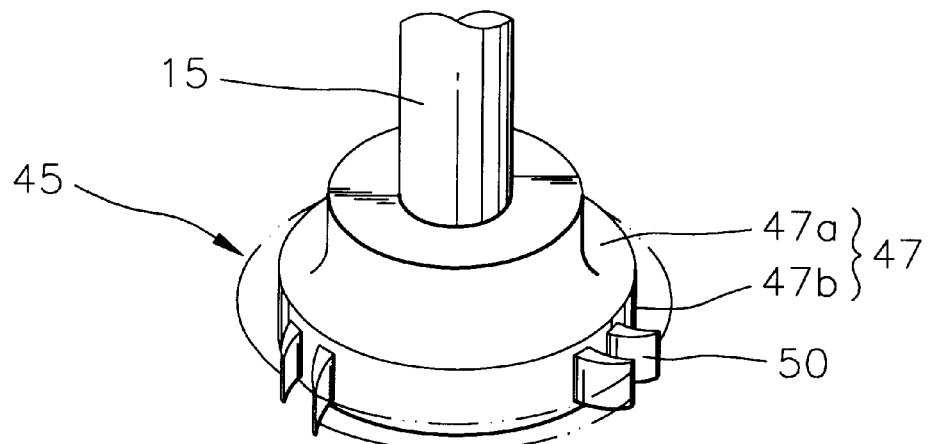
FIG. 3 represents a perspective view of the lower bearing of the preferred embodiment of the invention.
Figure 4:
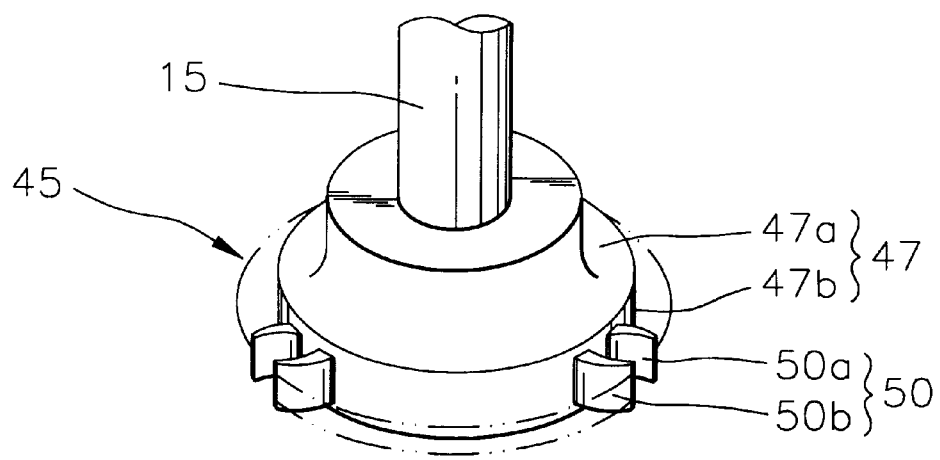
FIG. 4 illustrates the lower bearing in accordance with another preferred embodiment of the invention.

The pumping vanes 50, as shown in FIG. 3, protrude from the lower portion 47b of the outer peripheral side surface 47 of the lower bearing 45 in a radial direction and are circumferentially and regularly spaced apart from one another. It is preferable that each of the pumping vanes 50 is curved inwardly, and preferably, as shown in FIG. 4, the neighboring adjacent vanes 50a, 50b are curved inwardly in the opposite direction from each other, so as to be efficiently operated regardless of the rotating direction.

If the lower bearing 45 is of an oilless type, during rotation of the lower bearing 45, there may be a tendency for some of an oil impregnated in the lower bearing 45 to seep out therefrom as a result of the centrifugal force and thermal expansion of the lower bearing 45 and then to be retained in the bearing cavity 11.

In the inventive head drum assembly, during rotation of the lower bearing 45, the vanes 50 catch the oil lubricant 17 retained in the bearing cavity 11 and then distribute it uniformly between the thrust support surface 46 of the lower bearing 45 and the sliding surface, allowing the lower bearing 45 and the rotary drum 20 supported through the lower bearing 45 to rotate smoothly and preventing the video head 25 attached to the rotary drum 20 from vibrating, thereby reducing the jitter, i.e. screen shaking.

Although the invention has been shown and described with respect to the preferred embodiments, it will be understood by those skilled in the art that various changes and modifications may be made without departing from the spirit and scope of the invention as defined in the following claims.

What is claimed is:

1. A video cassette recorder having a head drum assembly, characterized in that the head drum assembly, comprises:
    a stationary drum including bearing cavity for retained an oil lubricant, the bearing cavity having a inclination to a main frame of the video cassette recorder;
    a supporting shaft divided into an upper portion and a lower portion, the lower portion fixedly fitted into the stationary drum;
    a rotary drum mounted around the upper portion of the supporting shaft;
    means for rotating the rotary drum; and
    bearing means for rotatably supporting the rotary drum and including a bearing fitted onto a lower end part of the rotary drum and mounted for rotating together with the rotary drum, the bearing having a thrust support surface being in contact with the sliding surface of the bearing cavity, wherein the bearing further has a pumping element for pumping the oil lubricant in such a way that the oil lubricant is uniformly distributed between the thrust support surface and the sliding surface.

2. The video cassette recorder according to claim 1, wherein the pumping element includes a plurality of pumping vanes which protrude radially from an outer peripheral side surface of the lower bearing.

3. The video cassette recorder according to claim 2, wherein the pumping vanes are circumferentially spaced apart from one another.

4. The video cassette recorder according to claim 2, wherein each of the pumping vanes is curved inwardly.

5. The video cassette recorder according to claim 3, wherein the neighboring adjacent vanes are curved inwardly in the opposite direction from each other.

6. The video cassette recorder according to claim 1, wherein the rotating means include a stator and a rotor electrically interacting with the stator, the stator being fitted onto an upper end portion of the supporting shaft, the rotor being fixed on a top surface of the rotary drum.

7. The video cassette recorder according to claim 1, further comprising an element for preventing the thrust support surface of the lower bearing and the bottom surface of the bearing cavity from being worn away, when the two surfaces come into a direct contact with each other, the element disposed between the thrust support surface and the bottom surface of the bearing cavity.

8. The video cassette recorder according to claim 7, wherein the element is disc-shaped.

9. The video cassette recorder according to claim 7, wherein a top surface of the element is the sliding surface.

* * * * *